United States Patent

Giarrizzo

[15] 3,675,398

[45] July 11, 1972

[54] EXHAUST FILTER ATTACHMENT

[72] Inventor: Lawrence P. Giarrizzo, c/o DeCesario 29 Jerome Ave., Hicksville, N.Y. 11801

[22] Filed: Oct. 15, 1970

[21] Appl. No.: 81,092

[52] U.S. Cl. ............................ 55/316, 55/387, 55/481, 55/485, 55/518, 55/524, 60/308, 60/311, 181/51
[51] Int. Cl. .......................................................... B01d 50/00
[58] Field of Search .................................. 55/316, 387–389, 55/478–481, 485–487, 518, 524; 181/51; 60/308, 311

[56] References Cited

UNITED STATES PATENTS

| | | | |
|---|---|---|---|
| 2,079,807 | 5/1937 | Kehl | 55/486 |
| 2,794,269 | 6/1957 | Isaacs | 55/518 |
| 3,224,171 | 12/1965 | Bowman | 55/DIG. 30 |

FOREIGN PATENTS OR APPLICATIONS

| | | | |
|---|---|---|---|
| 312,200 | 5/1929 | Great Britain | 181/51 |
| 808,806 | 2/1959 | Great Britain | 55/524 |
| 314,290 | 1/1934 | Italy | 181/51 |

*Primary Examiner*—Bernard Nozick
*Attorney*—Polachek & Saulsbury

[57] ABSTRACT

An exhaust filter attachment adapted to be attached to the exhaust pipe and carried rigidly thereon of any motored vehicle. This attachment is designed to filter all products of combustion leaving the vehicle, and to chemically treat the poisonous and health destructive gases; such as, the carbon monoxide and sulphur. The attachment comprises generally a sleeve housing with a conical mesh member extending from the forward end of the sleeve housing, and having thereon an attaching sleeve that will be secured to the end of the exhaust pipe by a clamp ring. Air is drawn inwardly or injected by the exhaust action of the gases being expelled from the exhaust pipe, and the mixture will be forced through a series of removable filter members extending transversly of the flow of the gases within the tube. Each of the filter elements comprises rings with filter material disposed between mesh disc end closures. When the filtering elements have been used they can be replaced or cleaned. The filtering material in these elements is chemically treated to consume the poisonous gases, reacting therewith to convert them into non-harmful gases. A charcoal device attachment is provided to be mounted on the sleeve, at the end thereof, and has an incline disc supporting charcoal particles in various degrees of longitudinal extent from the bottom to the top of the filter device so as not to seriously impede the flow of gases at the trailing end of the filtering attachment. Adequate drain mesh screens are provided in the spaces between the filtering elements and the charcoal material to get rid of water accumulation, and to provide means through which a particle accumulation can be observed to determine cleaning.

5 Claims, 4 Drawing Figures

PATENTED JUL 11 1972
3,675,398
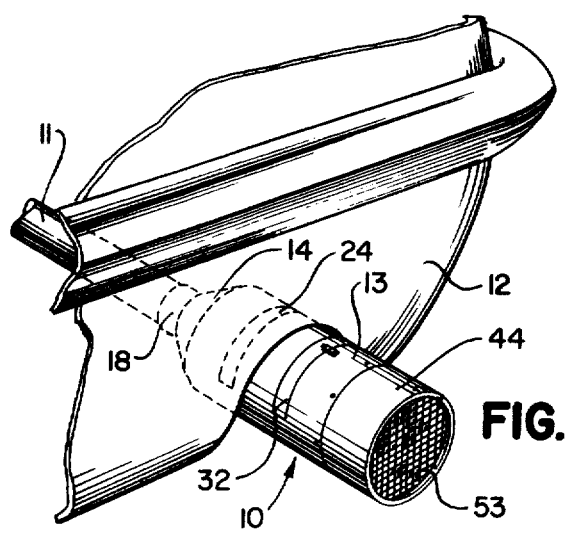
FIG.I.
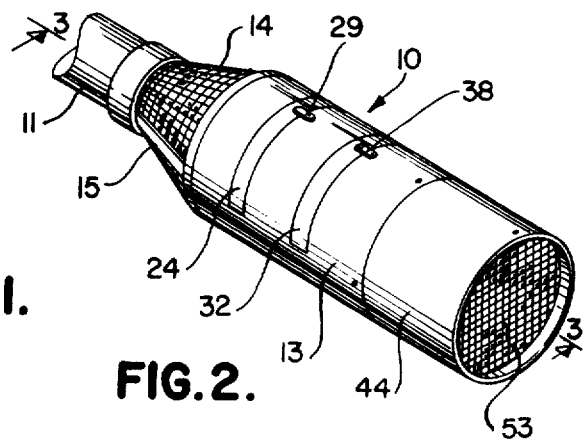
FIG.2.
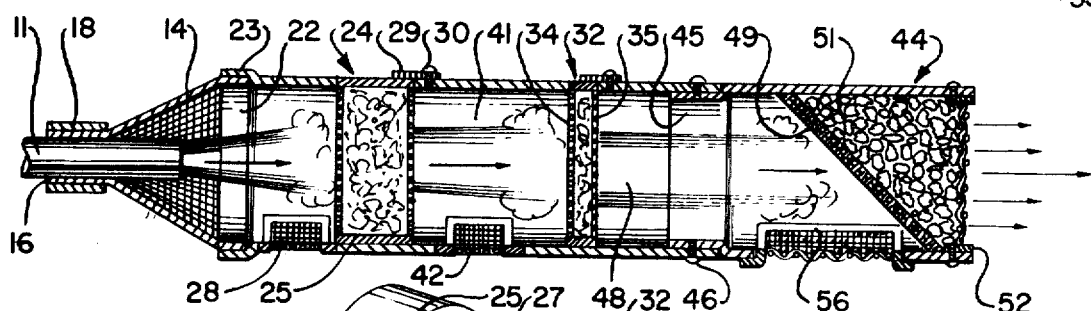
FIG.3.
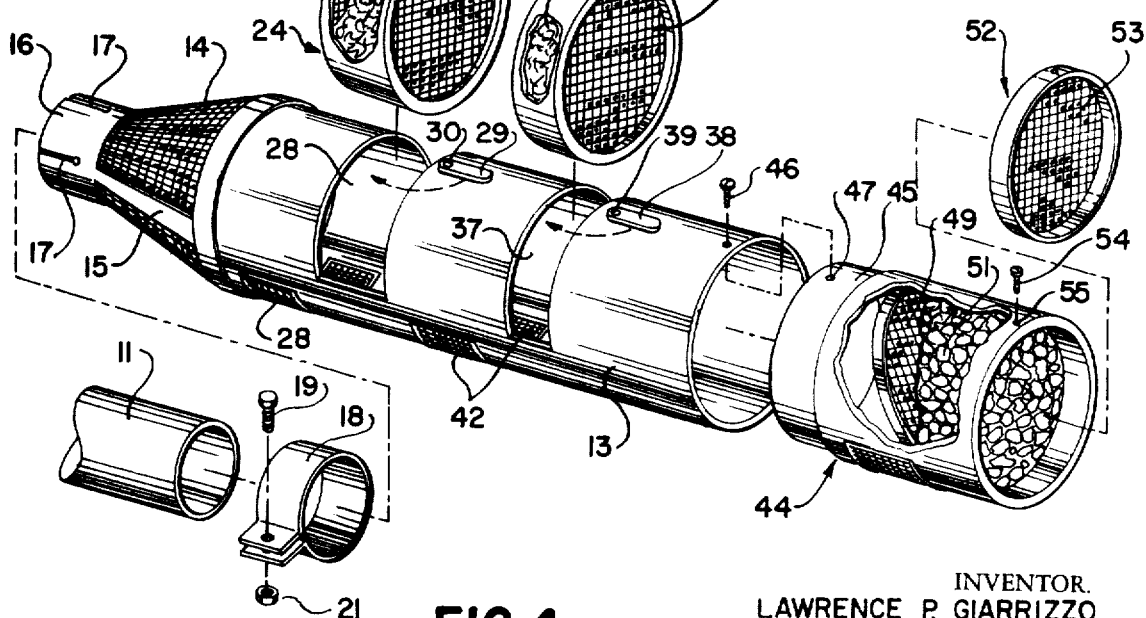
FIG.4.
INVENTOR.
LAWRENCE P. GIARRIZZO
BY
Polachek & Saulsbury
ATTORNEYS

EXHAUST FILTER ATTACHMENT

This invention relates to a vehicle exhaust filter attachment.

It is an object of the present invention to provide a filtering attachment that can be easily installed upon the exhaust pipe of a vehicle and supported thereby for the purpose of removing the destructive and unhealthy gases from the products of combustion being emitted from the exhaust pipe and to alleviate pollution of such gases in the atmosphere.

It is another object of the invention to provide a vehicle exhaust gas attachment which injects air to dilute the products of combustion within the filter attachment and wherein filtering elements are removably connected in the attachment housing so that they can be replaced by clean and other filtering elements.

It is still another object of the invention to provide a vehicle exhaust filter attachment with filtering elements containing chemicals that can chemically treat the gases to react with such gases and convert such gases such as carbon monoxide, sulphur gases, etc., into harmless gases or into chemicals that can be removable from the filter.

It is a further object of the invention to provide a vehicle gas filter attachment which is not only provided with filtering material that is chemically treated but which also has an extension attachment for the same containing charcoal material for the final filtering of the gases through the filter attachment and wherein this body of this charcoal material is so arranged as to provide a varied axial thickness from the bottom of the filter to the top so that back pressure or the various exhaust gases will not be imparted, and will allow the entire remaining gases to finally flow axially through the filtering attachment.

It is still a further object of the invention to provide a vehicle exhaust filter attachment having spaced elements of filtering material and charcoal and spaces therebetween with openings for the prevention of accumulation of water within the filtering device and through which collected particles in the filtering device can be observed and wherein the same provides access to the interior of the attachment casing.

Other objects of the invention are to provide a vehicle filter attachment having the above objects in mind which is of simple construction, has a minimum number of parts, easy to assemble and to clean, and efficient and effective in use.

For a better understanding of the invention, reference may be had to the following detailed description taken in connection with the accompanying drawings, in which:

FIG. 1 is a perspective view of a vehicle exhaust filter attachment embodying the features of the present invention attached to a vehicle exhaust pipe and extending rearwardly from the vehicle.

FIG. 2 is an enlarged perspective view of the exhaust filter attachment attached to the exhaust pipe but free of the vehicle.

FIG. 3 is a longitudinal sectional view of the filter attachment taken on line 3—3 of FIG. 2.

FIG. 4 is an exploded view of the several parts comprising the attachment with the coupling and filter parts lifted from the attachment housing.

Referring now to the figures, 10 generally represents the vehicle exhaust filter attachment that is adapted to be connected to a vehicle exhaust pipe 11 that extends rearwardly beneath a vehicle 12. The filter 10 has a main sleeve housing 13 through the forward end of which is connected a mesh and funnel shape connecting part 14 that is ribbed at 15 to give support to the mesh and to a connecting collar or sleeve 16 that has a plurality of slits 17 circumferentially spaced thereon to permit the expansion of the connecting sleeve 16 over the end of the exhaust pipe 11 for tight fitting engagement therewith. To make secure the attachment a band clamp 18 is extended about the sleeve extension 16 and over the slits 17 with its ends being joined together by a bolt 19 and nut 21 in FIG. 4. This clamping action is effected sufficiently to prevent any release of the filter attachment from the exhaust pipe under pressure or backfire and at the same time provide for a rigid support of the attachment against deflection from the exhaust pipe 11. The stiffening ribs 15 of the filter 14 are joined by an annular ring portion 22 that is tightly fitted under a flaring 23 of the sleeve housing 13. The exhaust pipe extends well into the mesh funnel 14 so as to effect upon the gases being expelled under pressure an injection of air that will proceed with the gases being expelled into a first filter element 24.

This filter element 24 is formed of a metal ring 25 having its ends closed by mesh discs 26 and 27 and filled with glass wool or any other suitable filtering material 24'. This filter 26 is dropped into a slot 28 in the sleeve 13 to close the sleeve and yet permit easy removal of the filter 24 when it has become dirty and needs to be replaced. The filter 24 is held in the slot 28 by a small latch arm 29 fixed to the top of the sleeve 13 by a screw 30 and pivoted to the position shown in FIG. 4 to be free of the slot 28 and allow the removal of the filter 24 therefrom.

The space into which the gases are first directed and thrusted against the filter 24 may collect any solid particles that may be observed through a mesh bottom piece 28 that can be removed from the bottom of the attachment sleeve 13 for the purpose of removing such solid material that may have accumulated in any great quantity. The filter 24 and more particularly its filtering material 24' of glass wool or the like, can be treated with a chemical particularly suitable for chemically consuming at least the carbon monoxide gas and to convert it into a non-harmful gas. Such other gases that may still remain in the products of combustion being expelled from the exhaust pipe 11 and which may or may not be as harmful, such as sulphur gases, may be disposed of and converted by a suitable chemically treated filter 32 of less width than the filter 24 and which is similarly formed of a ring 33 closed at its ends by mesh disc 34 and 35 and containing chemically treated material 36.

This filter 32 can be dropped into a slot 37 and retained therein by a latch arm 38 that can swing on a pivot pin 39 and extended to a position as shown in FIG. 3 to hold the filter ring 32 in place.

Any solid particles that may have penetrated the first filter 24, and is collected by the second filter 32 will be retained in the space 41 lying between the filters in the sleeve 13 and which can be observed through a mesh 42 in the bottom thereof. This mesh 42 can be removed to remove the particles so collected. The wire bottom meshes 28 and 42 in the bottom of the sleeve 13 will allow any water accumulation to exit.

On the outer end of the sleeve 13, a charcoal filter attachment indicated generally at 44 can be releasably attached by its reduced diameter cylindrical flange extension 45 upon release of screws 46 extending inwardly from the exterior of the sleeve 13 and into threaded openings 47 in the flange 45. The width of the flange 45 is sufficient to provide for rigid attachment with the free open end of the sleeve 13 that provides for a further accumulation space 48.

This charcoal filter device 44 has elongated wire mesh 49 that extends at an angle downwardly and rearwardly in the sleeve and through which gases will be extended into charcoal material 51 retained in the filter 44 by a mesh ring 52 having a single disc 53 and secured in place by screws 54 entering threaded holes 55. Any water or materials that may accumulate in the space 48 and in the charcoal filter device 44 can be removed or can exit through a removable mesh device 56 in the bottom of the device 44.

This charcoal device 44 can be removed at any time from the sleeves 13 by removing screws 46 and the charcoal device with its contents can be washed or the charcoal material 51 can be replaced by removing the mesh ring 52 now subjecting the device with its charcoal to a chemical wash treatment.

It should be apparent that the products of combustion being expelled from the exhaust pipe 11 will be given continuous treatment from one end to the other end of the housing and through the charcoal filter device 44. If there is any final destructive gases remaining, the quantity of the same would have been greatly reduced so that they will not reach the atmosphere from behind the vehicle. With this filter attachment, much pollution of the air resulting from exhaust gases should be alleviated with chemically treated filtering material for the destructive gases. The resultant gases are greatly purified and rendered harmless to the atmosphere.

The pressure expelling the gases from the exhaust pipe and with the filtering material being of such concentration as to admit the gases under force, and treat them while passing through the same; yet permit free flow of all of the gases to the end of the filtering attachment.

It should be understood that this attachment could be made in different sizes and adapted for different size exhaust pipes and for the larger vehicles as well as for the ordinary passenger vehicles and the dimensions and long filtering material with its chemical composition varied depending upon the required restrictions of the installation for any particular type of vehicle. It should also be apparent that this device can principally be adapted for use with other generators of smoke and products of combustion by a simple alteration of the construction of the device.

One great advantage of this device is that the filtering materials are readily accessible and the charcoal device can be readily cleaned so that the filtering attachment can always be kept in good working order at all times. Air is taken inwardly with the exhaust gases to dilute and render the products of combustion more vulnerable to the filtering action.

While various changes may be made in the detailed construction it will be understood that such changes shall be within the spirit and scope of the present invention as defined by the appended claims.

What is claimed is:

1. A vehicle exhaust filter attachment comprising a cylindrical sleeve having a conical shaped mesh member secured to the forward end of the sleeve, said conical mesh having an attaching sleeve ring at about the apex adapted to fit over and exhaust pipe extending from its forward end, said sleeve having spaced slots extending into the sides of the sleeve and transverse to the axis of the sleeve, and rings adapted to fit into the slots and containing filtering material positioned across the sleeve and means at the bottom of the sleeve for draining off water accumulation in the sleeve.

2. A vehicle exhaust filter attachment as defined in claim 1, and each filtering member comprising a ring adapted to enter the sleeve slots in tight fitting engagement therewith, mesh discs closing the opposite ends of the ring and filtering material lying in the ring between the mesh disc.

3. A vehicle exhaust filter attachment as defined in claim 1, and a charcoal filter device having means for removably attaching the same to said sleeve, and mesh means within the charcoal device for confining the charcoal material therewithin while permitting axial flow of the final remaining products of combustion therethrough.

4. A vehicle exhaust filter attachment as defined in claim 3, and said means for combining the charcoal filtering material comprising an elongated disc mounted in the charcoal device to be inclined to the axial flow of gases therethrough and a mesh disc at the end of the charcoal device and charcoal material disposed between the disc.

5. A vehicle exhaust filter attachment as defined in claim 4, and said charcoal device having a drain in the bottom thereof to exit water accumulation, and a wire mesh frame removably attached in the bottom opening of the exhaust filter device.

* * * * *